(12) United States Patent
Zhou

(10) Patent No.: US 8,807,773 B2
(45) Date of Patent: Aug. 19, 2014

(54) BACKLIGHT MODULE

(75) Inventor: GeGe Zhou, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 283 days.

(21) Appl. No.: 13/510,000

(22) PCT Filed: Mar. 23, 2012

(86) PCT No.: PCT/CN2012/072876
§ 371 (c)(1),
(2), (4) Date: May 15, 2012

(87) PCT Pub. No.: WO2013/134967
PCT Pub. Date: Sep. 19, 2013

(65) Prior Publication Data
US 2013/0242539 A1 Sep. 19, 2013

(30) Foreign Application Priority Data
Mar. 13, 2012 (CN) .......................... 2012 1 0065316

(51) Int. Cl.
G09F 13/08 (2006.01)
(52) U.S. Cl.
USPC .......................................... 362/97.1; 362/632

(58) Field of Classification Search
CPC .................................................. G02F 1/333615
USPC .................................................. 362/97.1, 632
See application file for complete search history.

(56) References Cited

FOREIGN PATENT DOCUMENTS

| CN | 102200259 A | 9/2011 |
| CN | 202082747 U | 12/2011 |
| TW | 201137468 A | * 11/2011 |

* cited by examiner

Primary Examiner — Vip Patel
(74) Attorney, Agent, or Firm — Cheng-Ju Chiang

(57) ABSTRACT

The present invention provides a backlight module, which includes a backplane and a backlight source fixed to the backplane through fusion. The backplane includes a first backplane segment and a second backplane segment coupled to the first backplane segment. The present invention provides a backlight module, which includes a backplane that is formed by combining a material of high thermal conductivity and a material of high strength. The backplane has a great strength, excellent thermal conductivity, and low cost so as to reduce the overall cost of the entire backlight module. Further, a backlight source is fixed, through fusion, to the backplane made of a material of high thermal conductivity so that the backlight source and the backplane are connected in a gap-free manner to further improve the performance of thermal conduction of the backlight module.

8 Claims, 2 Drawing Sheets

BACKLIGHT MODULE

BACKGROUND OF THE INVENTION

1. Field of the Invention

The present invention relates to the field of liquid crystal displaying, and in particular to a backlight module.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules interposed between two parallel glass plates and a plurality of vertical and horizontal fine electrical wires is arranged between the two glass plates, whereby the liquid crystal molecules are controlled to change direction by application of electricity to refract light emitting from the backlight module for generating images. Since the liquid crystal display panel itself does not emit light, light must be provided by the backlight module in order to generate images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal display panel to form a planar light source to directly provide lighting to the liquid crystal display panel. The side-edge backlight module arranged a backlight source, such as an LED light bar based light source, at an edge of a back panel that is located rearward of one side of the liquid crystal display panel. The LED backlight source emits light that enters a light guide plate through a light incident face of the light guide plate and is projected out through a light exit face after being reflected and diffused to thereby form a planar light source to be provided to the liquid crystal display panel.

A conventional backlight module generally comprises a backplane, a light guide board, a backlight source, and optic films. The backplane is generally made of a single material, which is for example aluminum plate, steel plate, or plastic plate. If the backplane is completely made of a steel plate, then a heat dissipation element is additionally used. This increases the costs. If the backplane is completely made of an aluminum plate, then no additional heat dissipation element is necessary. Although aluminum has better thermal conductivity than steel, yet the backplane uses only a portion thereof to effect heat dissipation, while the remaining portion provides a function of support rather than dissipation of heat. This is adverse to expenditure control and support and retention of liquid crystal module.

The conventional ways of mounting a backlight source to a backplane includes thermally conductive adhesive tapes or bolts. A backlight source can be fixed by thermally conductive adhesive tapes to a backplane, but the thermally conductive adhesive tapes have great thermal resistance and has a thermal conductivity of around 0.9-6 W/K*m. On the other hand, aluminum shows a thermal conductivity up to 137 W/K*m. Although the thermal conductivities of the backlight source and the backplane are great, yet the thermally conductive adhesive tapes have relatively low thermal conductivity, so that the heat generated by the backlight source cannot be efficiently removed. For the case where the backlight source is fixed to the backplane by bolts, air layers are commonly present between the backlight source and the backplane at locations where no bolt is applied. Since the thermal conductivity of air is even poorer, the thermal resistance at the contact surface is increased, making the overall heat dissipation poor.

SUMMARY OF THE INVENTION

An objective of the present invention is to provide a backlight module that has excellent heat dissipation performance and low cost.

To achieve the objectives, the present invention provides a backlight module, which comprises a backplane and a backlight source that is fixed to the backplane through fusion. The backplane comprises a first backplane segment and a second backplane segment coupled to the first backplane segment.

The first backplane segment and the second backplane segment are made of different materials.

The first backplane segment is made of a material of high thermal conductivity, and the second backplane segment is made of a material of high strength. The backlight source is fixed to the first backplane segment through fusion.

The first backplane segment is made of aluminum sheet and the second backplane segment is made of steel sheet.

The first backplane segment comprises a first bottom plate and the second backplane segment comprises a second bottom plate. The first bottom plate has an end coupled to an end of the second bottom plate. The backlight source is fixed to an opposite end of the first bottom plate through fusion.

The first backplane segment comprises a first bottom plate and a first side plate perpendicularly mounted to the first bottom plate and the second backplane segment comprises a second bottom plate and a second side plate perpendicularly mounted to the second bottom plate. The backlight source is fixed to the first side plate through fusion.

The first and second backplane segments are coupled to each other by rivet connection or screw connection.

The fusion comprises welding.

The backlight module further comprises a reflector board mounted on the backplane, a light guide board arranged on the reflector board, and an optic film positioned on the light guide board.

The backlight source comprises a linear LED light bar.

The efficacy of the present invention is that the present invention provides a backlight module, which comprises a backplane that is formed by combining a material of high thermal conductivity and a material of high strength. The backplane has a great strength, excellent thermal conductivity, and low cost so as to reduce the overall cost of the entire backlight module. Further, a backlight source is fixed, through fusion, to the backplane made of a material of high thermal conductivity so that the backlight source and the backplane are connected in a gap-free manner to further improve the performance of thermal conduction of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to preferred embodiments of the present invention and the attached drawings.

Figure 1:
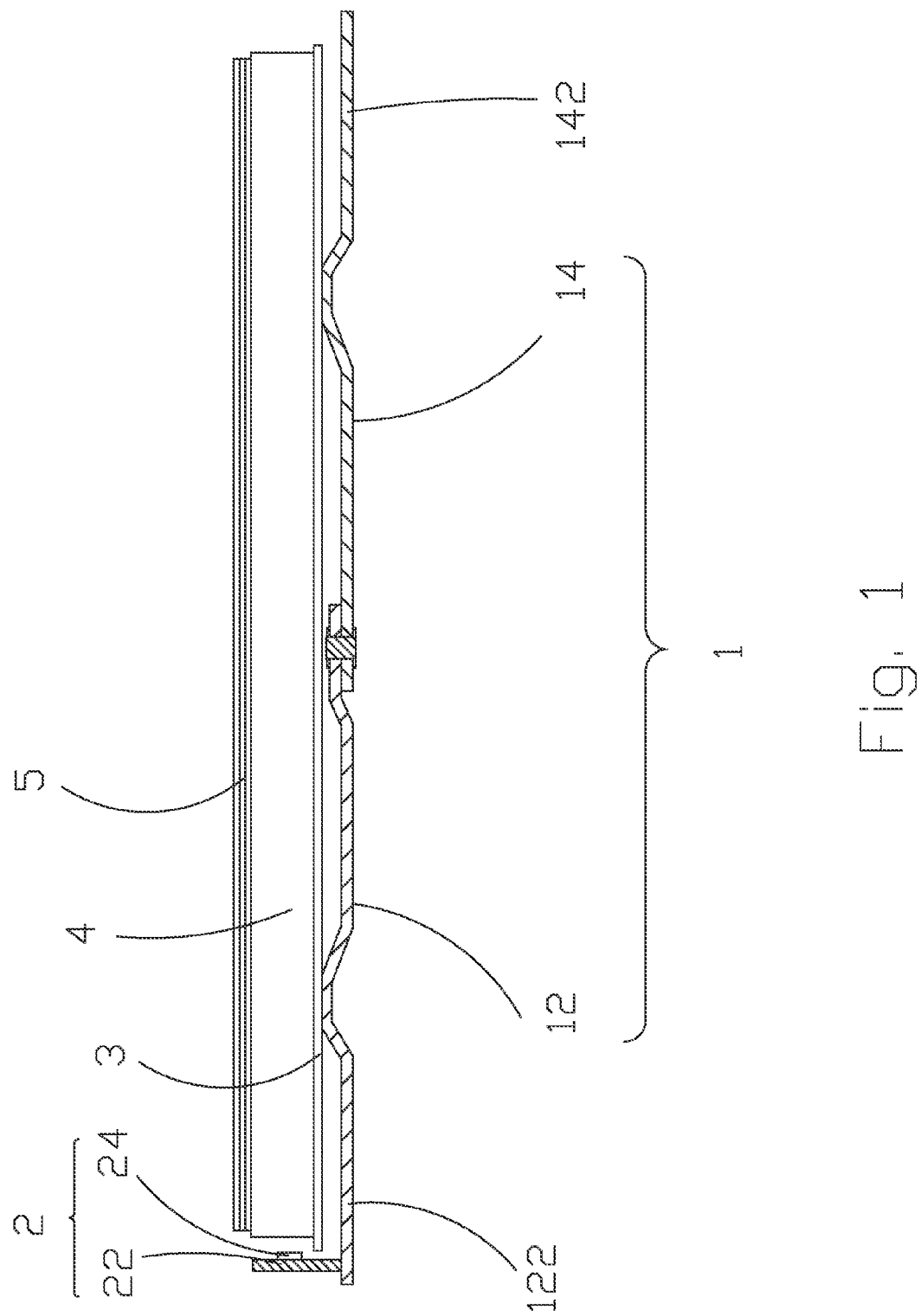
FIG. 1 is a cross-sectional view showing the structure of a backlight module according to an embodiment of the present invention.
Figure 2:
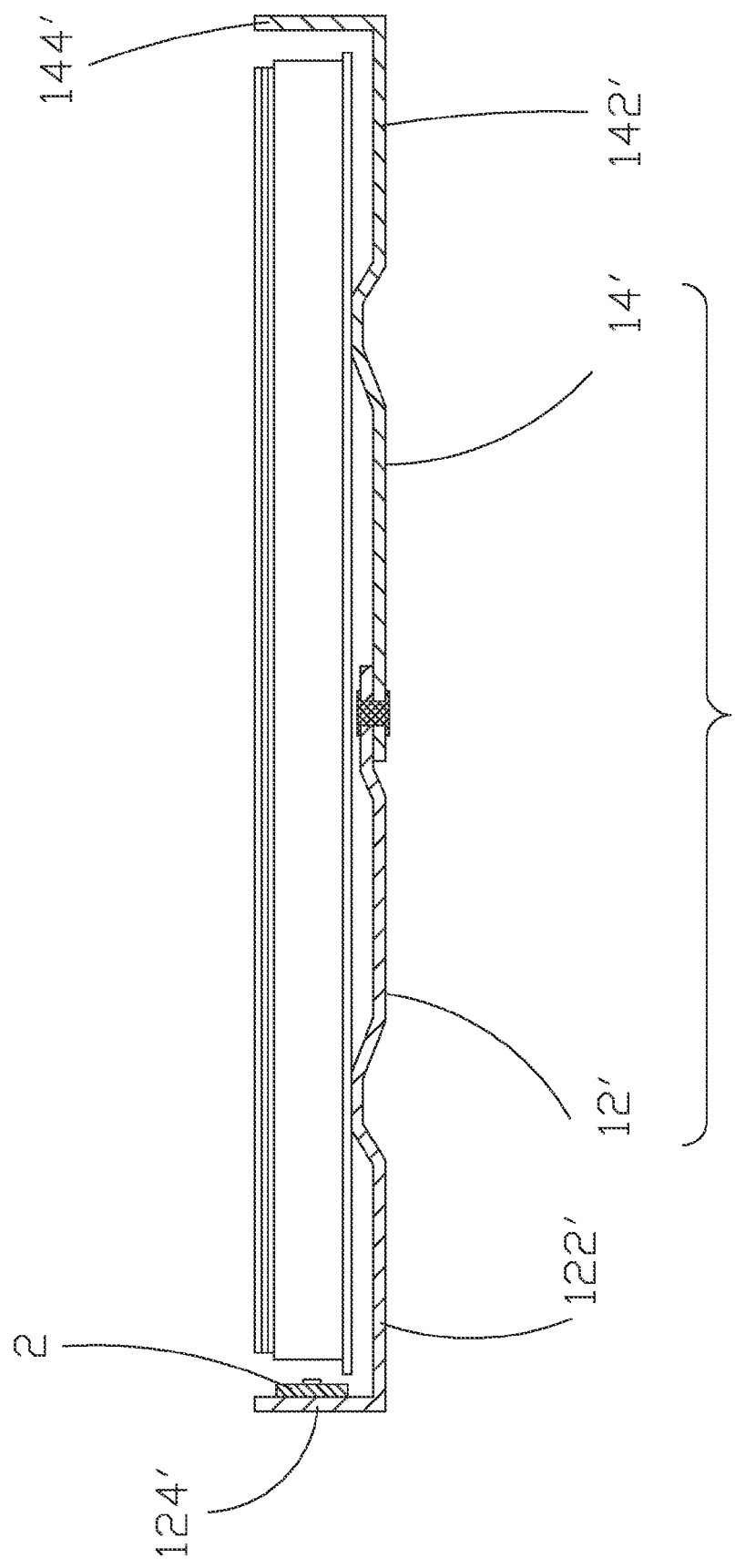
FIG. 2 is a cross-sectional view showing the structure of a backlight module according to another embodiment of the present invention.

Referring to FIGS. 1 and 2, the present invention provides a backlight module, which comprises a backplane 1 and a backlight source 2 that is fixed to the backplane 1 through fusion.

The backplane 1 comprises a first backplane segment 12 and a second backplane segment 14 coupled to the first backplane segment 12. The first backplane segment 12 and the second backplane segment 14 are made of different materials. The first backplane segment 12 is made of a material of high thermal conductivity, such as aluminum sheet. The second backplane segment 14 is made of a material of high strength, such as a steel sheet. The first backplane segment 12 comprises a first bottom plate 122. The second backplane segment 14 comprises a second bottom plate 142. The first bottom plate 122 has an end that is coupled to an end of the second bottom plate 142 by screws or rivets. The backlight source 2 comprises a linear LED (Light-Emitting Diode) light bar. The backlight source 2 comprises a printed circuit board 22 and an LED light 24 mounted on the printed circuit board 22. The printed circuit board 22 may comprises a conventional metal substrate. The printed circuit board 22 is fixed to an opposite end of the first bottom plate 122 of the first backplane segment 12 through fusion so as to form a single-edge backlight module. Since the backlight source 2 is connected to the first backplane segment 12 that is made of a material of high thermal conductivity, the heat generated due to the LED light 24 emitting light can be fast transferred through the printed circuit board 22 to the first backplane segment 12 and the first backplane segment 12 then dissipates the heat to the surrounding atmosphere so as to ensure excellent heat conduction performance of backlight module. Further, the printed circuit board 22 of the backlight source 2 is fixed to the first backplane segment 12 through fusion and in the instant embodiment, the fusion operation comprises welding. Thus, the backlight source 2 and the first backplane segment 12 are connected in a gap-free manner to further improve the performance of heat conduction of backlight module. Further, the second backplane segment 14 that is made of a material of high strength ensures the strength of the whole backplane 1, preventing backlight module from being compressed that cause damages, so as to improve the overall quality of the backlight module. Further, the second backplane segment 14 is of a relatively low cost so that the manufacture cost of the entire backlight module can be reduced.

The backlight module further comprises a reflector board 3 mounted on the backplane 1, a light guide board 4 arranged on the reflector board 3, and optic films 5 positioned on the light guide board 4. Light emitting from the backlight source 2 transmits through the light guide board 4 to enter the optic films 5 so as to provide a uniform planar light source to a liquid crystal display panel (not shown).

Referring to FIG. 2, a backlight module according to another embodiment of the present invention is shown in a cross-sectional view and is different from the previous embodiment in that a backplane 1' comprises first and second backplane segments 12', 14'. The first backplane segment 12' has an end coupled to an end of the second backplane segment 14' by screws or rivets. The first backplane segment 12' comprises a first bottom plate 122' and a first side plate 124' perpendicularly mounted to an opposite end of the first bottom plate 122'. The second backplane segment 14' comprises a second bottom plate 142' and a second side plate 144' perpendicularly mounted to the second bottom plate 142'. The backlight source 2 is fixed to the first side plate 124' of the first backplane segment 12' of the backplane 1' and the fusion operation adopted is preferably welding. The backlight source 2 and the first backplane segment 12' are connected in a gap-free manner to provide the same technical effect as the previously discussed. Repeated description will be omitted here.

The present invention provides a backlight module, which comprises a backplane that is formed by combining a material of high thermal conductivity and a material of high strength. The backplane has a great strength, excellent thermal conductivity, and low cost so as to reduce the overall cost of the entire backlight module. Further, a backlight source is fixed, through fusion, to the backplane made of a material of high thermal conductivity so that the backlight source and the backplane are connected in a gap-free manner to further improve the performance of thermal conduction of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane and a backlight source that is fixed to the backplane through fusion, the backplane comprising a first backplane segment and a second backplane segment coupled to the first backplane segment, the first backplane segment and the second backplane segment being made of different materials, the first backplane segment being made of a material of high thermal conductivity, the second backplane segment being made of a material of high strength, the backlight source being fixed to the first backplane segment through fusion.

2. The backlight module as claimed in claim 1, wherein the first backplane segment is made of aluminum sheet and the second backplane segment is made of steel sheet.

3. The backlight module as claimed in claim 1, wherein the first backplane segment comprises a first bottom plate and the second backplane segment comprises a second bottom plate, the first bottom plate having an end coupled to an end of the second bottom plate, the backlight source being fixed to an opposite end of the first bottom plate through fusion.

4. The backlight module as claimed in claim 1, wherein the first backplane segment comprises a first bottom plate and a first side plate perpendicularly mounted to the first bottom plate and the second backplane segment comprises a second bottom plate and a second side plate perpendicularly mounted to the second bottom plate, the backlight source being fixed to the first side plate through fusion.

5. The backlight module as claimed in claim 1, wherein the first and second backplane segments are coupled to each other by rivet connection or screw connection.

6. The backlight module as claimed in claim 1, wherein the fusion comprises welding.

7. The backlight module as claimed in claim 1 further comprising a reflector board mounted on the backplane, a light guide board arranged on the reflector board, and an optic film positioned on the light guide board.

8. The backlight module as claimed in claim 1, wherein the backlight source comprises a linear LED light bar.

\* \* \* \* \*